United States Patent [19]

Long et al.

[11] 4,404,555
[45] Sep. 13, 1983

[54] ADDRESSING SCHEME FOR SWITCH CONTROLLED LIQUID CRYSTAL DISPLAYS

[75] Inventors: John R. Long, Vanier; Carla J. Miner; Richard W. Streater, both of Nepean; David R. Baraff, Ottawa, all of Canada

[73] Assignee: Northern Telecom Limited, Montreal, Canada

[21] Appl. No.: 271,973

[22] Filed: Jun. 9, 1981

[51] Int. Cl.³ .............................................. G09G 3/36
[52] U.S. Cl. .................................... 340/784; 340/811; 350/333
[58] Field of Search ......................... 340/784; 350/333

[56] References Cited

U.S. PATENT DOCUMENTS

| | | | |
|---|---|---|---|
| 3,809,458 | 5/1974 | Heuner et al. | 350/333 |
| 3,895,372 | 7/1975 | Kaji et al. | 340/784 |
| 4,223,308 | 9/1980 | Baraff et al. | 340/784 X |

Primary Examiner—David L. Trafton
Attorney, Agent, or Firm—Stuart L. Wilkinson

[57] ABSTRACT

In known thin film switch controlled matrix multiplexed liquid crystal displays (LCD's), alternating pulses of an applied waveform are of reverse polarity. If the transient behaviour characteristic of the switches controlling the LCD is not saturated during application of a selection pulse, the selected pels may experience a relatively low RMS voltage in the ON state. To ensure that selected pels are fully turned on, the addressing waveform proposed consists of a series of pulses of one polarity followed by a corresponding series of pulses of opposite polarity. Transient effects are minimized by applying the series of unipolar pulses and the pels are consequently subjected to a high RMS voltage. However, net DC current through the LC is still zero as required in order to guard against irreversible electrochemical degradation of the LC. The higher RMS voltage can be used to improve contrast ratio or to increase the level of multiplexing.

6 Claims, 5 Drawing Figures

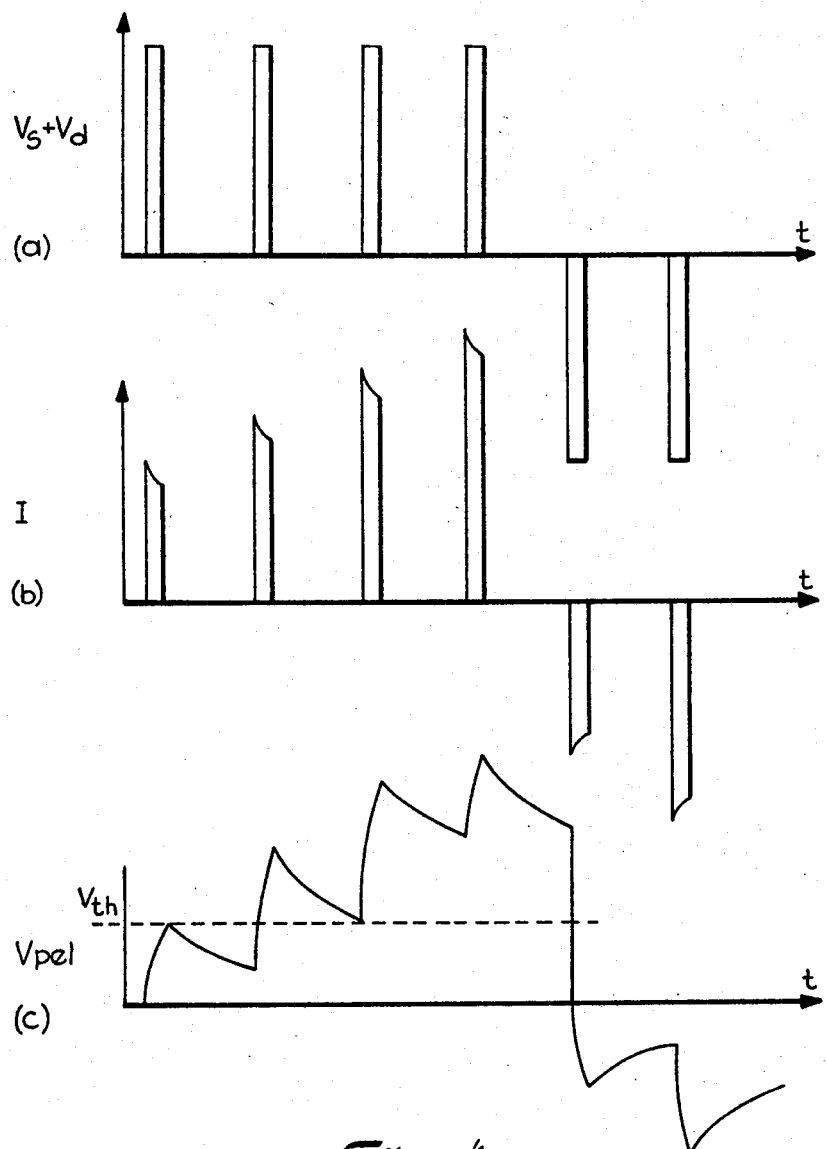

4,404,555

ADDRESSING SCHEME FOR SWITCH CONTROLLED LIQUID CRYSTAL DISPLAYS

BACKGROUND OF THE INVENTION

This invention relates to a method for addressing a matrix multiplexed thin film switched liquid crystal display (LCD) and to a LCD arrangement, particularly adapted for that method.

Copending U.S. patent application Ser. Nos. 060,290 filed July 25, 1979, now U.S. Pat. No. 4,002,308; Ser. No. 044,247 filed May 31, 1979; and Ser. No. 060,274 filed July 25, 1979, now U.S. Pat. No. 4,251,136, in the name of the present assignee, all disclose matrix multiplexed LCDs. Briefly, these LCDs consist of a pair of transparent confining plates with a layer of liquid crystal sandwiched between them. Formed on the inside surfaces of the plates are opposed row-column arrays of electrodes. To locally alter the optical transmissivity of a picture element or pel of the display, a selection voltage is applied between the appropriate pair of opposed electrodes. This has the effect of subjecting an intervening part of the LC layer to an electric field which alters a field related optical characteristic of the LC and thus changes the optical transmissivity of the LCD in that locality.

In order to reduce the number of addressing leads required, one scheme for matrix multiplexing the LCD is to interconnect the pel electrodes on one plate by electrical leads extending in the column direction and to interconnect the pel electrodes on the other plate by electrical leads extending in the row direction. In an addressing scheme for the display, a series of scan pulses $V_s$, are, for example, applied sequentially to each of the row leads, (scan lines) while reverse polarity data pulses $V_d$ are applied periodically to selected ones of the column leads (data lines). To turn on a picture element at a selected row and column intersection, a selection voltage equal to the difference between $V_s$ and $V_d$ is made great enough to locally alter the field related optical characteristic of the LC. Non-selected pulses in a scanned line are subjected to a voltage equal to the sum of the opposite polarity voltages $V_s$ and $V_d$.

Several factors combine to limit the number of lines that can be multiplexed in a LCD.

Firstly, at the instant a pel is selected, other, non-selected pels in the selected column also experience a pulse $V_d$. For one address period, the rms voltage experienced by these pels is insufficient to turn them on, but if N pels in a column are switched on and off in a single field scan, a non-selected pel in that column will experience $V_d$ for N address periods. This may be enough to turn the non-selected pel on. It can be shown that the ratio of rms voltage experienced by a selected pel to that experienced by a non-selected pel is:

$$\frac{V_{rms}^{selected}}{V_{rms}^{non-selected}} = \sqrt{\frac{(V_s + V_d)^2 + V_d^2(N-1)}{(V_s - V_d)^2 + V_d^2(N-1)}}$$

As N increases, the ratio becomes smaller and, since field effect materials such as LCs do not have a sharp threshold distinguishing on from off, the contrast ratio between selected and non-selected pels becomes poorer. At a certain number of matrix rows, the contrast ratio becomes unacceptable.

This problem is compounded for LC displays which have a narrow viewing angle. Also, since the electro-optic response of field effect materials is generally temperature dependent, then if a pel is to be off at $V_{non-select}$ (at high temperature), and on at $V_{select}$ (at low temperature), the difference between $V_{non-select}$ and $V_{select}$ must be greater than for constant temperature operation. For the above reasons, the known level of multiplexing displays is limited.

This problem can be alleviated by placing a controlling switch in series with each pel at the intersections of scan and data lines. In use, pulses $V_d$ or $|V_s| - |V_d|$ do not activate a switch pel combination whereas a selection pulse $|V_s| + |V_d|$ does activate the switch, whereupon the liquid crystal experiences voltage.

The copending applications mentioned previously disclose several forms of LCD controlling switches fabricated by thin film techniques, the most favoured being a switch based on a MIM (metal-insulator-metal) device which functions by tunnelling or trap depth modulation. In a typical addressing scheme for switch controlled LCD pels, a waveform for a selected pel consists of an alternating series of positive and negative pulses, a scan pulse polarity reversal in one direction coinciding with polarity reversal in the opposite direction of data pulses. Polarity reversal is necessary in order to prevent any net DC component through the LC which would result in irreversible electrochemical degradation of the LC.

SUMMARY OF THE PRESENT INVENTION

It has now been observed that the performance of a LCD controlled by thin film switches can be improved by driving LC pels with alternating series of pulses, a series of one polarity alternating with a corresponding series of reverse polarity.

Owing, it is suspected, to the establishment of equilibrium between current carrier trapping and de-trapping rates in the thin film switches being non-instantaneous, the current to a selected switch-LC pel combination does not reach an optimum, steady state value on application of a single pulse. Each time that the polarity is changed, drift is quenched and current builds again towards the equilibrium value. If instead of reversing polarity after every pulse, a series of successive unipolar pulses are applied, the current level increases as each pulse is applied up to an asymptotically approached limit. Subsequently, polarity is reversed. Since a selected pel addressed by this scheme experiences a larger average electric field than a selected pel addressed from an identical power source by pulses of alternating polarity, the visual contrast between selected and unselected pels is greater. For unselected pels which, during a scan period, are subjected only to a voltage $V_s$ or $|V_s| - |V_d|$, the increase in current with time can be made negligible with appropriate choice of voltage levels.

As an alternative to securing a greater contrast ratio by this addressing system, a higher level of multiplexing can be achieved if the initial contrast ratio is maintained.

BRIEF DESCRIPTION OF THE DRAWINGS

An embodiment of the invention will now be described, by way of example, with reference to the accompanying drawings in which:

FIG. 4 shows the variation with time, for a particular selected MIM switch-LCD pel combination, of selection voltage (FIG. 3(a)); of MIM switch current (FIG. 3(b)); and of LC voltage using the same time axis.

DETAILED DESCRIPTION OF THE PREFERRED EMBODIMENT

Figure 1:
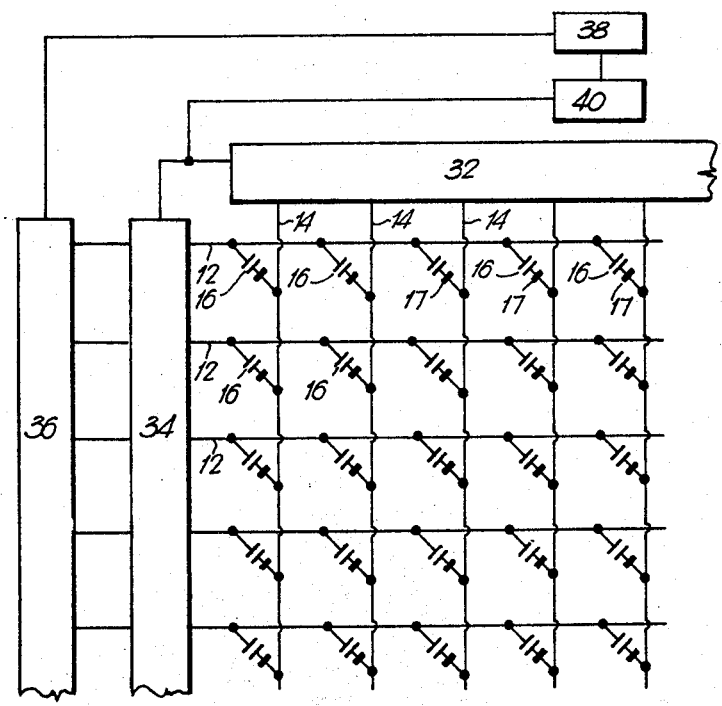
FIG. 1 is a circuit schematic drawing of a switch controlled LCD and associated drive circuitry.
Figure 2:
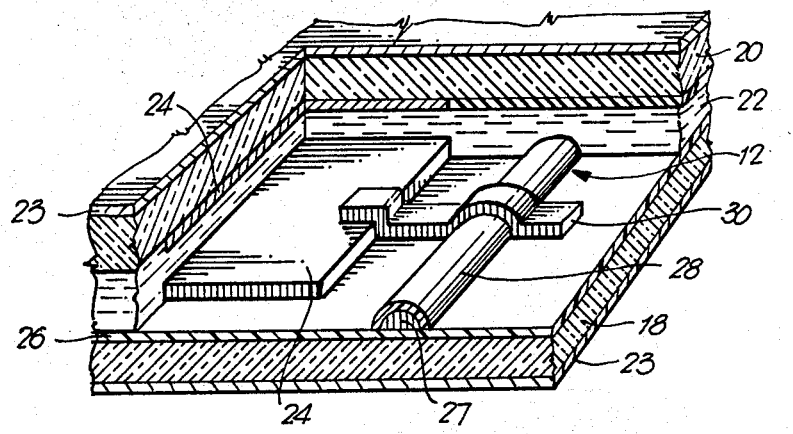
FIG. 2 is a perspective sectional view with part cut away of a LCD picture element controlled by a thin film switch.

Referring in detail to FIG. 1, the electrical components of a matrix multiplexed LCD 10 include a series of row conductors 12 and a series of column conductors 14. As shown in FIG. 2, the conductors 12 and 14 are formed on a pair of glass plates 18, 20 with a layer of twisted nematic LC 22 sealed between them and linear polarizers 23 applied to their outside surfaces. The polarizers 23 have their polarizing axes perpendicular to one another. The inner surface of the plates 28, 30 are treated in a manner known in the art so that in the absence of an applied electric field, LC molecules adjacent the two plates line up with the axis of polarization. The longitudinal axes of the LC molecules twist through a right angle across the thickness of the LC layer 22. By applying a voltage across selected regions of the LC layer, the LC can be caused to undergo localized molecular reorientation. Light passing into the LCD through one plate is polarized and then, at the other plate, is extinguished, the applied voltage thus reducing the optical transmissivity of the LCD. The pels are defined by a row-column array of transparent electrodes 24 on the inside surfaces of plates 18 and 20. The electrodes 24 on the plate 18 are connected in rows by row conductors 12 and the electrodes 24 on the plate 20 are connected in columns by leads 14.

The picture elements or pels 16, which in FIG. 1 are represented by the crossover locations of conductors 12 and 14, each have a dedicated MIM switch 17 consisting of a thin film 27 of tantalum adjacent the glass substrate, an insulating thin film 28 of anodized tantalum, and a top contact thin film 30 of NiCr:Au. The MIM switch operates by a combination of tunnelling and carrier trap depth modulation.

Referring back to FIG. 1, the scan and data lines 12 and 14 are driven by scan and data bipolar drivers 32 and 34. The scanning sequence is set by a ring counter 36 under the control of a clock generator 38. Also driven by the clock generator is a frequency divider 40 which determines when polarity reversal of the two bipolar drivers takes place.

Figure 3A:
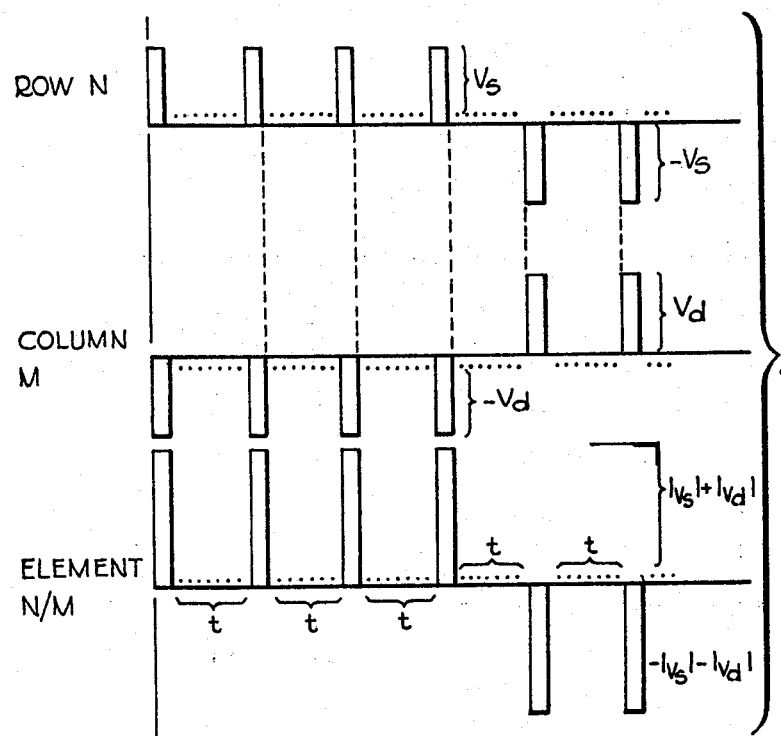
FIG. 3(a) shows voltage pulse trains for application to selected pels of the FIG. 2 LCD.
Figure 3B:
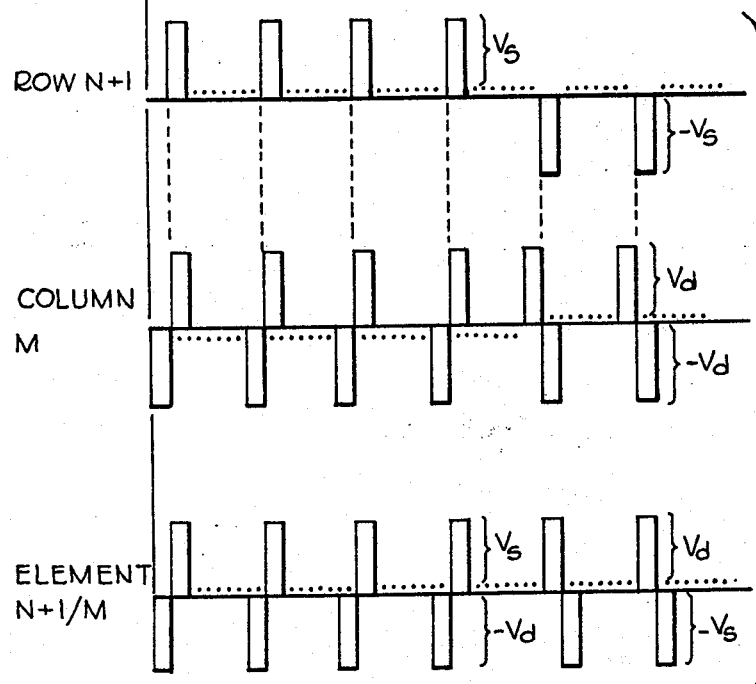
FIG. 3(b) shows voltage pulse trains applied to non-selected pels of the FIG. 2 LCD.

Referring now to FIG. 3a, there are shown waveforms for addressing a selected picture element at row N, column M, of the matrix multiplexed display 10. The voltage experienced by the selected elements is a series of electrical pulses each of voltage $|V_s| + |V_d|$ where $V_s$ is the scan voltage applied to the row conductors 12 on one plate and $V_d$ is the data voltage applied to a particular column conductor 14 on the other plate 20. After four pulses, spaced from one another by the matrix scan time, t, of the display, the polarity of pulses applied to the particular row and column conductors is reversed and the selected elements experience pulses of voltage $-|V_s| - |V_d|$. This reversal prevents any long term DC component which would cause irreversible electrochemical breakdown of the LC. As shown in FIG. 3b a non-selected pel at row N+1, column M experiences at any time a maximum voltage of $|V_d|$ or $|V_s| - |V_d|$, the net DC component again being zero.

FIG. 4 shows the voltage waveform for a selected pel, (FIG. 4, waveform a), together with the corresponding variation of current I through a switch, (FIG. 4, waveform b), and the voltage applied across the LC (FIG. 4, waveform c), all as a function of time. A current pulse directed through the MIM switch decays as the LCD pel charges, so reducing the voltage across the switch. In addition, because of transient effects in the MIM switch, the current does not reach a stable output value until a number of consecutive unipolar pulses of the waveform have been applied. Because of the switch transient effects, if pulse polarity is reversed after every pulse, the current through the switch never reaches a stable value. In effect, using such an addressing scheme for a switched matrix multiplexed LCD of this type, the display is never fully turned on.

As illustrated, by using a waveform in which polarity reversal only takes place after a series of unipolar pulses, the pel voltage reaches a value $V_{th}$ at which the display is fully turned on. The current decay time increases with increasing LC pel capacitance. The voltage across the LC pel depends on the difference between the charging and discharging time constants of the LC. As mentioned previously, the transient effect of MIM switches occurs, it is thought, owing to the time taken for the establishment of equilibrium between current carrier trapping and de-trapping rates in the thin film MIM switch. Other mechanisms may also be responsible for this effect. Certainly, other types of thin film switch which may find use in matrix multiplexed LCDs show similar transient behaviour so enabling this addressing scheme to be beneficially used. The rate of polarity reversal must be greater than 30 Hz which is the flicker fusion rate. The number of pulses between polarity reversals is limited by the number of lines being multiplexed.

What is claimed is:

1. A method for addressing individual picture elements of a matrix multiplexed liquid crystal electrical field dependent optical transmissivity display, the display comprising a pair of plates, at least one of the plates being transparent, the plates having sealed therebetween a layer of liquid crystal, a first row-column array of electrodes on an inside surface of one plate and a corresponding second row column array of electrodes on an inside surface of the other plate, the display having a plurality of picture elements, each element defined by a pair of electrodes one from said first array and one from said second array, the electrodes of one plate being electrically interconnected by column leads, the electrodes on the other plate being electrically interconnected by row leads, each picture element having a series connected thin film switch, said switches being formed on the inside surface of at least one of the plates, said method for addressing individual picture elements comprising: applying scan voltage pulses to successive ones of the row leads and applying data voltage pulses of opposite polarity to selected ones of the column leads wherein the polarity of said scan and data pulses is periodically reversed, said periodic reversal taking place between successive series of unipolar pulses.

2. A matrix multiplexed liquid crystal electrical field dependent optical transmissivity display comprising a pair of plates, at least one of the plates being transparent, the plates having sealed therebetween a layer of liquid crystal, a first row column array of electrodes on an inside surface of one plate and a corresponding second row column array of electrodes on an inside surface of the other plate, the display having a plurality of picture elements, each element defined by a pair of electrodes one from said first array and one from said second array, the electrodes on one plate being electrically interconnected by column leads, the electrodes on the other plate being electrically interconnected by row leads, each picture element having a series connected thin film switch, the switches formed on the inside surface of at least one of the plates, first drive means for applying scan voltage pulses to the row leads, second drive means for applying data voltage pulses to the column leads, and switch means for periodically reversing the polarity of the applied voltage pulses between successive series of unipolar pulses.

3. A matrix multiplexed display as claimed in claim 2, in which said switch means includes a clock and a frequency divider having an output driving both of said first and second drive means.

4. A matrix multiplexed display as claimed in claim 3, in which the clock drives a ring counter and the ring counter controls the first drive means to sequentially scan the row conductors.

5. A matrix multiplexed display as claimed in claim 4, in which the second drive means has a first input from the frequency divider and a second, data input.

6. A matrix multiplexed display as claimed in claim 4, in which the first and second drive means are bipolar drivers.

* * * * *